United States Patent
Su et al.

(10) Patent No.: US 11,682,941 B2
(45) Date of Patent: Jun. 20, 2023

(54) WIRING APPARATUS FOR MOTOR AND CORRESPONDING MOTOR

(71) Applicant: ABB Schweiz AG, Baden (CH)

(72) Inventors: Yun Su, Shanghai (CN); Guangming Xie, Shanghai (CN); Fengqing Lin, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 122 days.

(21) Appl. No.: 17/189,420

(22) Filed: Mar. 2, 2021

(65) Prior Publication Data

US 2021/0296958 A1    Sep. 23, 2021

(30) Foreign Application Priority Data

Mar. 17, 2020    (CN) .......................... 202010188022.0

(51) Int. Cl.
*H02K 3/52*    (2006.01)
*H02K 3/02*    (2006.01)

(52) U.S. Cl.
CPC .............. *H02K 3/522* (2013.01); *H02K 3/02* (2013.01); *H02K 2203/06* (2013.01); *H02K 2203/09* (2013.01)

(58) Field of Classification Search
CPC .. H02K 3/00; H02K 3/02; H02K 3/52; H02K 3/522; H02K 2203/06; H02K 2203/09
(Continued)

(56) References Cited

U.S. PATENT DOCUMENTS

| 4,689,023 A | 8/1987 | Strong, III et al. |
| 7,692,356 B2 * | 4/2010 | Bott ........................ H02K 3/522 310/260 |

(Continued)

FOREIGN PATENT DOCUMENTS

| CN | 1464614 A | 12/2003 |
| CN | 1720653 A | 1/2006 |

(Continued)

OTHER PUBLICATIONS

Chinese Office Action and Search Report, issued by the Chinese Patent Office, regarding corresponding patent application Serial No. CN202010188022.0; dated Oct. 9, 2021;11 pages (with English Translation).

(Continued)

*Primary Examiner* — Rashad H Johnson
(74) *Attorney, Agent, or Firm* — Greenberg Traurig, LLP

(57) ABSTRACT

Embodiments of the present disclosure relate to a wiring apparatus for a motor and a corresponding motor. The wiring apparatus comprises an annular member and a conductor. The annular member has a first side adjacent to the motor and a second side opposite to the first side. The conductor is embedded in the annular member and comprises a plurality of joints coupled to each other via a conductive bar. The annular member comprises a first group of holes and a second group of holes. The group of holes each extend from the first side to the plurality of joints and the second group of holes arranged opposite to the first set of holes and each extends from the second side to the plurality of joints. The wiring apparatus according to embodiments of the present disclosure has a simple and compact structure, which greatly improves the efficiency of wiring.

16 Claims, 7 Drawing Sheets

(58) Field of Classification Search
USPC ............................... 310/179, 184, 198, 208
See application file for complete search history.

(56) References Cited

U.S. PATENT DOCUMENTS

| | | | |
|---|---|---|---|
| 10,447,112 B2* | 10/2019 | Capoulun | H02K 7/14 |
| 11,424,658 B2* | 8/2022 | Guntermann | B60H 1/3222 |
| 2003/0086800 A1 | 5/2003 | Kurihara et al. | |
| 2014/0183992 A1 | 7/2014 | Seo et al. | |
| 2015/0325333 A1* | 11/2015 | Muto | H02K 3/30 |
| | | | 428/376 |
| 2020/0365294 A1* | 11/2020 | Tomizawa | H02K 3/30 |

FOREIGN PATENT DOCUMENTS

| | | |
|---|---|---|
| CN | 202309300 U | 7/2012 |
| CN | 202550819 U | 11/2012 |
| CN | 104852498 A | 8/2015 |
| CN | 105119411 A | 12/2015 |
| CN | 206878589 U | 1/2018 |
| CN | 208955778 U | 6/2019 |
| CN | 110011456 A | 7/2019 |
| DE | 112016003656 T5 | 5/2018 |
| FR | 3071112 A1 | 3/2019 |
| JP | H07284239 A | 10/1995 |
| JP | 2004048950 A | 2/2004 |

OTHER PUBLICATIONS

Extended European Search Report, issued by the European Patent Office, regarding corresponding patent application Serial No. EP21160507.6; dated Aug. 2, 2021; 8 pages.

* cited by examiner

A-A

WIRING APPARATUS FOR MOTOR AND CORRESPONDING MOTOR

FIELD

Embodiments of the present disclosure generally relate to a field of motors, and more particularly to a wiring apparatus for a winding end of a servo motor.

BACKGROUND

Servo motors have a wide range of applications, for example, industrial robots, especially small and medium-sized AC servo motors. Servo motors are characterized by a compact structure, a large batch, and a high cost performance. The motor is required to be as small and exquisite as possible. There is also a high requirement for automation of manufacturing.

In the conventional motor technology, wiring of the winding end is usually cumbersome and less efficient. For small and medium-sized servo motors with concentrated windings, traditional wiring methods make ends of motor windings thicker, which is unfavorable to a compact design of the servo motor. Especially when the axial size of the motor is strictly limited, an excessively large wiring height of the winding end limits the length of a motor core, which makes the motor design more difficult.

SUMMARY

For example, in the existing Chinese patent application CN 105119411A, there is provided a connection structure for a stator winding wiring ring of an AC motor. This structure is sequentially, from the outside to the inside, arranged with three external wiring rings, an insulating layer skeleton and an internal wiring ring. With such a structure, there are a large number of components and an additional pressing operation on the enameled wire is required, resulting in a complicated process and inefficient wiring. In addition, due to the fact that the method for wiring is single, the application range of this connection structure is greatly restricted.

Embodiments of the present disclosure provide a wiring apparatus for a motor and a corresponding motor, which intend to at least partially solve the above and/or other potential problems in the design of the wiring of the motor.

In a first aspect, embodiments of the present disclosure provide a wiring apparatus for a motor. The wiring apparatus comprises an annular member having a first side adjacent to a motor and a second side opposite to the first side; and a conductor embedded in the annular member and comprising a plurality of joints coupled to each other via a conductive bar; wherein the annular member comprises a first group of holes and a second group of holes, the first group of holes each extending from the first side to the plurality of joints, the second group of holes arranged opposite to the first set of holes and each extending from the second side to the plurality of joints.

According to embodiments of the present disclosure, the wiring apparatus has a compact structure and reliable wiring. Moreover, the wiring process does not require additional crimping and other procedures, which greatly improves the wiring efficiency.

In some embodiments, the annular member further comprises a groove arranged at a periphery of the annular member and extending from the first side to the second side, the groove being adapted for an enameled wire of the motor to pass through from the first side to enter the second set of holes on the second side, so as to be connected to the joint.

In some embodiments, the annular member further comprises a welding hole provided at a periphery of the annular member and extending from the first side to the second side, the welding hole being adapted for a lead wire of the motor to pass through to be welded to the lead wire.

In some embodiments, the welding hole comprises a plurality of welding holes arranged adjacent to each other at the periphery of the annular member.

In some embodiments, the wiring apparatus further comprises a protrusion adjacent to a periphery of the annular member and extending from the first side toward the motor so as to be inserted into a recess of the periphery of a stator of the motor.

In some embodiments, the conductor is made of a metal comprising copper.

In some embodiments, the annular member is made of an insulating material.

In some embodiments, wherein the conductive bar is helically arranged in the annular member and is insulated from outside by the annular member.

In a second aspect, embodiments of the present disclosure comprise a motor. The motor comprises the wiring apparatus according to the first aspect.

BRIEF DESCRIPTION OF THE DRAWINGS

Through the following detailed description with reference to the accompanying drawings, the above and other objectives, features, and advantages of embodiments of the present disclosure will become easier to understand. In the accompanying drawings, a plurality of embodiments of the present disclosure will be described in an exemplary and non-limiting manner, wherein.

DETAILED DESCRIPTION OF EMBODIMENTS

Figure 1:
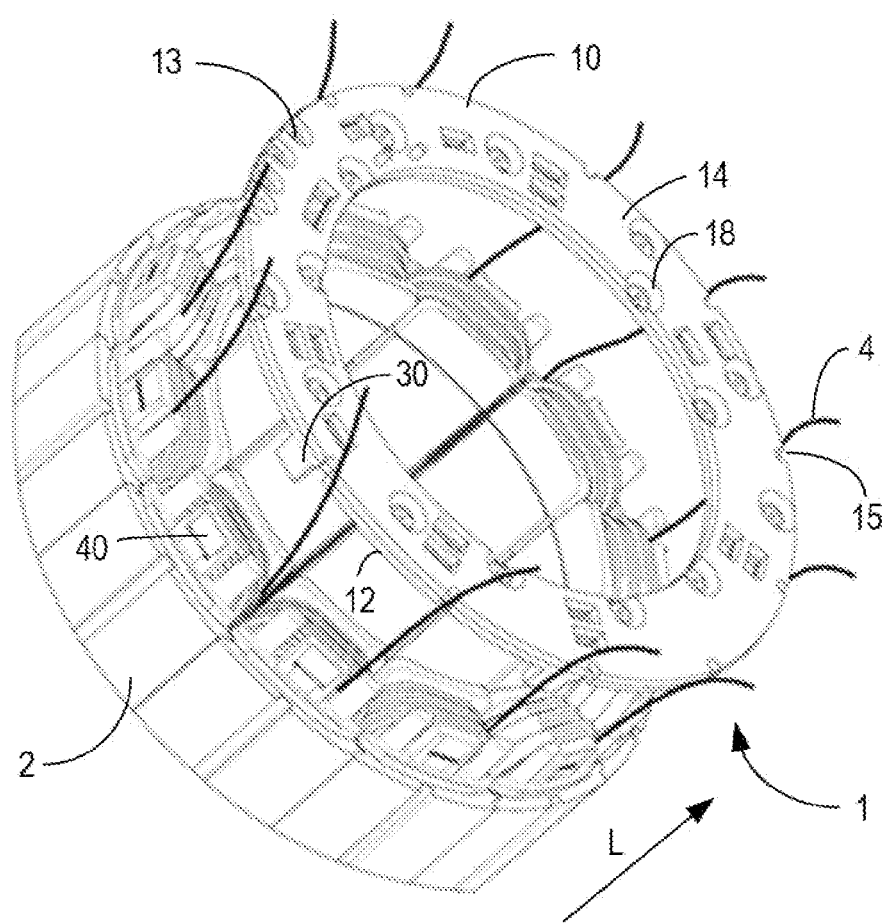
FIG. 1 is a schematic perspective view illustrating the assembly of a wiring apparatus to a motor according to an embodiment of the present disclosure.

The principle of the present disclosure will now be described with reference to various embodiments in the drawings. It should be understood that these embodiments are only for the purpose of enabling those skilled in the art to better understand and thereby implement the present disclosure, and are not described for the purpose of placing any limitation on the scope of the present disclosure. It should be noted that similar or identical reference signs may be used in the drawings where feasible, and similar or identical reference signs may indicate similar or identical elements. Those skilled in the art will understand that alternative embodiments of the structures and methods described herein may be adopted without departing from the principles of the present disclosure described from the following description.

As mentioned above, in the existing wiring scheme, an enameled wire and a lead wire of the winding adopt the traditional connection method, which is cumbersome and cannot be achieved automatically. In addition, the thickness of a motor winding terminal is increased, which is not conducive to heat dissipation of a motor.

To solve the above problems, the present disclosure provides wiring apparatus with a simple structure and which is easy to realize automatic wiring.

Implementations of embodiments of the present disclosure will be described with reference to FIGS. 1 to 7.

Figure 2:
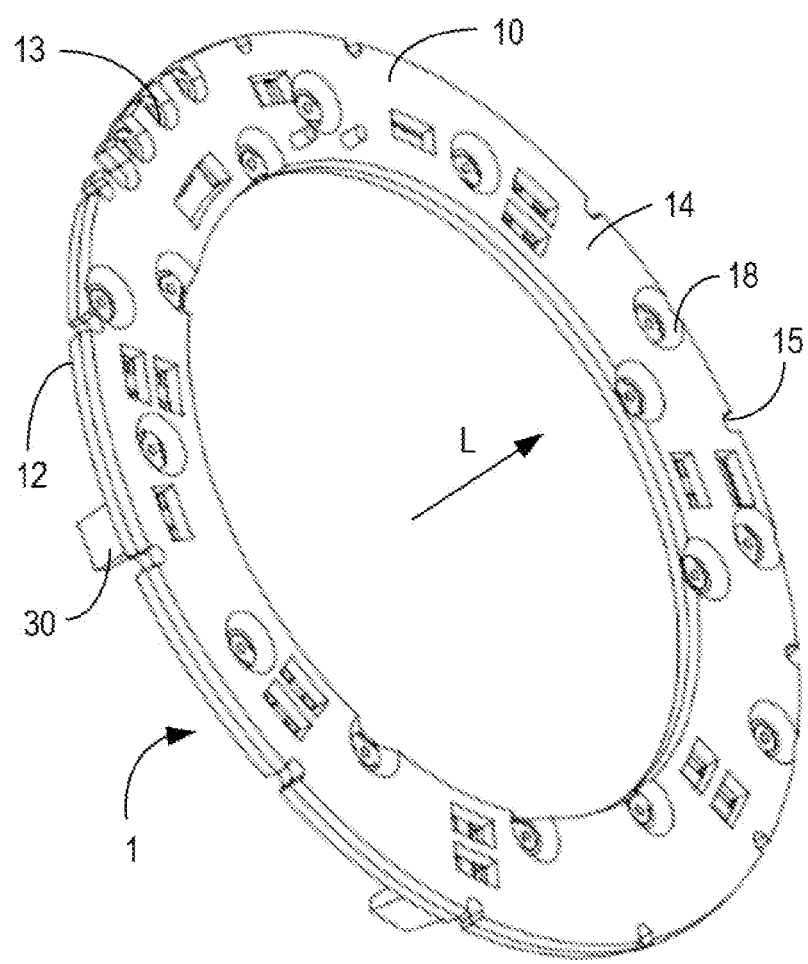
FIG. 2 is a schematic perspective view illustrating a wiring apparatus according to an embodiment of the present disclosure.

Embodiment of the present disclosure relate to a wiring apparatus 1 for a motor 2. As shown in FIG. 1, the wiring apparatus 1 generally comprises an annular member 10 and a conductor 20 embedded in the annular member 10. With reference to FIG. 2, the annular member 10 is arranged near a leading-out terminal of a winding of the motor 2 and has a first side 12 adjacent to the motor 2 and a second side 14 opposite to the first side 12.

Figure 4:
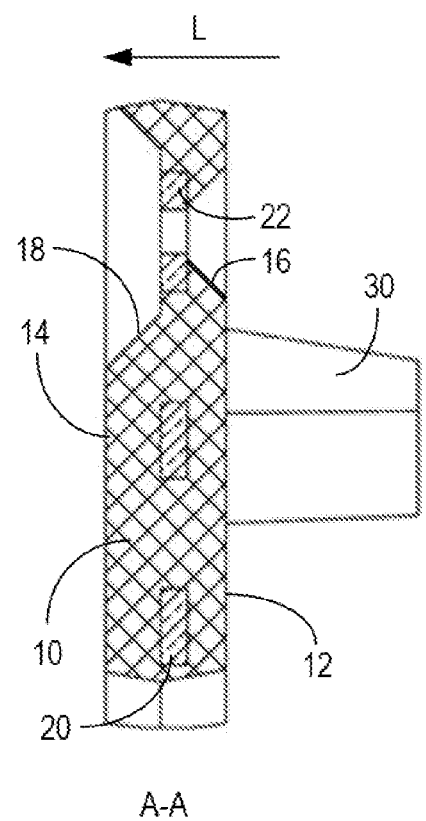
FIG. 4 is a cross sectional view illustrating a part of a wiring apparatus taken along the line A-A in FIG. 3.

FIG. 4 is a cross sectional view of a part of the annular member 10. As shown in FIG. 4, the conductor 20 is embedded in the annular member 10 and is surrounded by the annular member 10. The conductor 20 comprises a conductive bar 24 and a plurality of joints 22 coupled to each other via the conductive bar 24. The annular member 10 comprises a first group of holes 16 and a second group of holes 18 arranged opposite to the first set of holes 16. The first group of holes 16 each extends from the first side 12 to the plurality of joints 22. The second group of holes 18 each extend from the second side 14 to the plurality of joints 22. As shown in FIG. 4, each hole in the first set of holes 16 and each hole in the second set of holes 18 extend from opposite sides to the corresponding joints 22.

According to embodiments of the present disclosure, as shown in FIG. 1, since the conductive bar 24 connects the plurality of joints 22 to each other, an enameled wire 4 of the motor 2 can be coupled together in a predetermined manner through the joints 22. In addition, the annular member 10 can be designed to have a smaller size (i.e., thickness) in a direction L substantially parallel to the axial direction of the motor 2. In this way, when the wiring apparatus 1 realizes a wiring function of the motor 2, no additional space in the direction L is required, making the structure of the motor 2 more compact. Such a configuration is beneficial in small and medium-sized servo motors.

Figure 7:
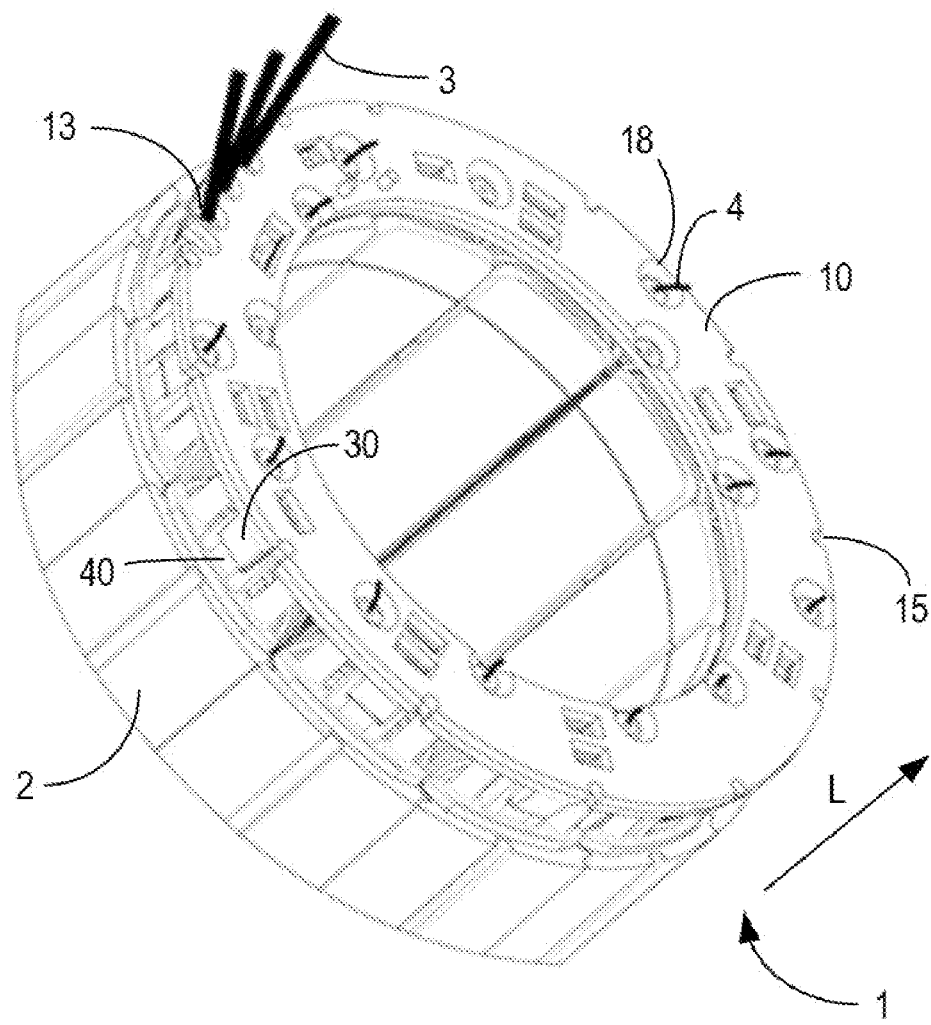
FIG. 7 is another schematic perspective view illustrating a state after assembling a wiring apparatus to a motor according to an embodiment of the present disclosure, in which an enameled wire of the motor and the wiring apparatus are connected by a perforated connection.

In some embodiments, as shown in FIG. 7, a plurality of enameled wires 4 of the motor 2 may extend from the motor 2 and be connected to the joints 22 via one side of the wiring apparatus 1 close to the motor 2. Specifically, with reference to FIG. 4, the enameled wire 4 is inserted into the corresponding first set of holes 16 from the first side 12 of the annular member 10 of the wiring apparatus 1 substantially along the direction L and is coupled to the corresponding joints 22. Since the joints 22 are coupled to each other through the conductive bar 24, in this way, the plurality of enameled wires 4 can be coupled to each other in a predetermined manner. Such a wiring method is called multiple parallel wiring.

Figure 6:
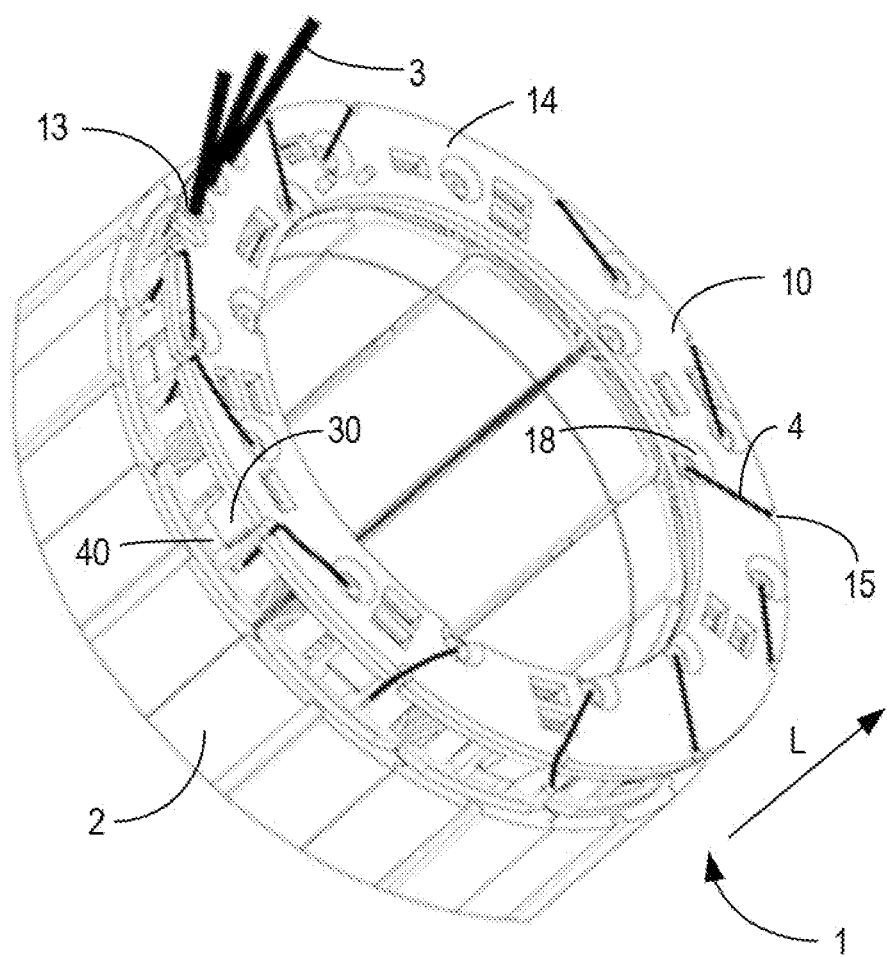
FIG. 6 is a schematic perspective view illustrating a state after assembling a wiring apparatus to a motor according to an embodiment of the present disclosure, in which an enameled wire of the motor and the wiring apparatus are connected by surface connection.

In other embodiments, as shown in FIG. 6, the plurality of enameled wires 4 of the motor 2 may also be connected to the joints 22 via a side of the wiring apparatus 1 away from the motor 2. Referring to FIG. 2, the annular member 10 may further comprise a groove 15 provided at the periphery thereof. The groove 15 extends from the first side 12 to the second side 14 for the enameled wires 4 of the motor 2 to pass through from the first side 12. The enameled wires 4 can thus be connected to the joints 22 via the second set of holes 18 on the second side 14. Since the joints 22 are coupled to each other via the conductive bar 24, in this way, the plurality of enameled wires 4 can be coupled to each other in a predetermined manner. Such a wiring method is called one-way parallel wiring.

According to embodiment of the present disclosure, the enameled wires 4 can be connected to the wiring apparatus 1 from different directions, thereby achieving a flexible wiring. In this way, users are allowed to adopt a corresponding wiring method according to a specific usage environment, and the applicability of the wiring apparatus 1 is improved.

Figure 3:
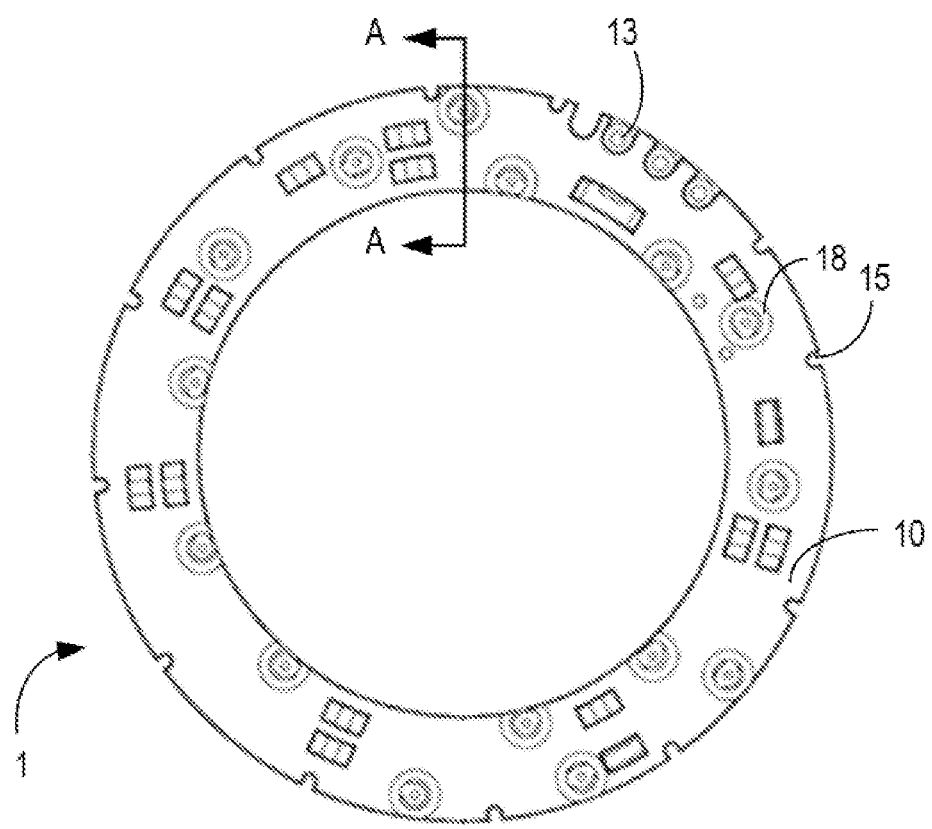
FIG. 3 is a schematic front view illustrating a wiring apparatus according to an embodiment of the present disclosure.

In some embodiments, as shown in FIG. 3, the annular member 10 may further comprise a welding hole 13 provided at the periphery of the annular member 10. The welding hole 13 extends from the first side 12 to the second side 14 and is adapted for a lead wire 3 of the motor 2 to pass through to be welded to the lead wire 3.

FIGS. 6 and 7 show the states where the welding hole 13 and the lead wire 3 are welded. When assembling the lead wire 3 to the welding hole 13, users can first approach the wiring apparatus 1 to the motor 2 and then align the lead wire 3 with the welding hole 13 and then pass the lead wire 3 through the welding hole 13 so as to realize the welding of the lead wire 3 and the welding hole 13. After the welding is completed, as discussed above, users can connect the enameled wire 4 to the joints 20 of the motor 2 either from the first set of holes 16 on the first side 12 or from the second set of holes 18 on the second side 12 according to the predetermined wiring method. The lead wire 3 can be directly welded on the wiring apparatus 1 neatly and compactly so as to save the space for a leading out a wire.

In this way, with the wiring apparatus 1, no special tools are required to realize the wiring of the lead wire 3 and the enameled wire 4. The wiring procedure is easy to complete, which greatly improves the users' working efficiency.

In some embodiments, as shown in FIG. 2, the welding holes 13 may comprise a plurality of welding holes 13 arranged adjacent to each other at the periphery of the annular member 10. The welding holes 13 may be provided at the periphery of the annular member 10 adjacent to each other. Although only three welding holes 13 are shown in FIG. 2, it is clear that users can change the number of welding holes 13 according to specific requirements, for example, two or four. The specific number is not limited by embodiments of the present invention.

In some embodiments, as shown in FIGS. 2 and 3, the wiring apparatus 1 may further comprise a protrusion 30 adjacent to the periphery of the annular member 10. Referring to FIG. 4, the protrusion 30 extends from the first side 12 close to the motor 2 toward the motor 2. Referring back to FIG. 1, in an alternative embodiment, a recess 40 is provided at the periphery of the stator of the motor 2, and the position and size of the recess 40 are designed to match the protrusion 30 to facilitate the insertion of the protrusion 30 into the recess 40, in order to realize the connection of the wiring apparatus 1 and the motor 2. In some embodiments, the recess 40 may be provided at a terminal of a stator core insulation frame of the motor 2. In use, users can weld the lead wire 3 to the welding hole 13 after inserting the protrusion 30 of the wiring apparatus 1 into the recess 40 of the motor 2.

Since the protrusions 30 are arranged at an edge of the annular member 10, the radial dimension of the annular member 10 will not be increased. In addition, the space in the recess 40 of the motor 2 is properly used for coupling with the protrusion 30. Therefore, when the wiring apparatus 1 and the motor 2 are assembled, the size of the assembled wiring apparatus 1 and the motor 2 in the direction L will not be increased. In this way, the size of the motor 2 can be more compact and such a compact design can speed up heat dissipation from the motor 2.

In an alternative embodiment, the wiring apparatus 1 and the motor 2 can be connected in other ways, such as a snap connection, a magnetic connection, and so on. The specific manner of connection can be adjusted according to actual needs, and is not limited by embodiments of the present disclosure. In this way, the connection of the device 1 and the motor 2 can be firmly connected without increasing the size of the motor 2. Therefore, the potential safety hazards caused by weak wiring can be avoided.

In some embodiments, the conductor 20 may be made of a metal comprising copper. Copper can ensure a stable connection among the various joints 22 of the conductor 20. In alternative embodiments, other materials may be used in addition to copper, such as aluminum. Users can choose appropriate materials according to actual needs, such as cost considerations. The specific materials are not limited by embodiments of the present disclosure.

In some embodiments, the annular member 10 may be made of an insulating material. The insulating material can be resin or plastic. It is to be understood that the annular member 10 can be made of materials other than the materials listed here, as long as the material can achieve an insulating effect.

Figure 5:
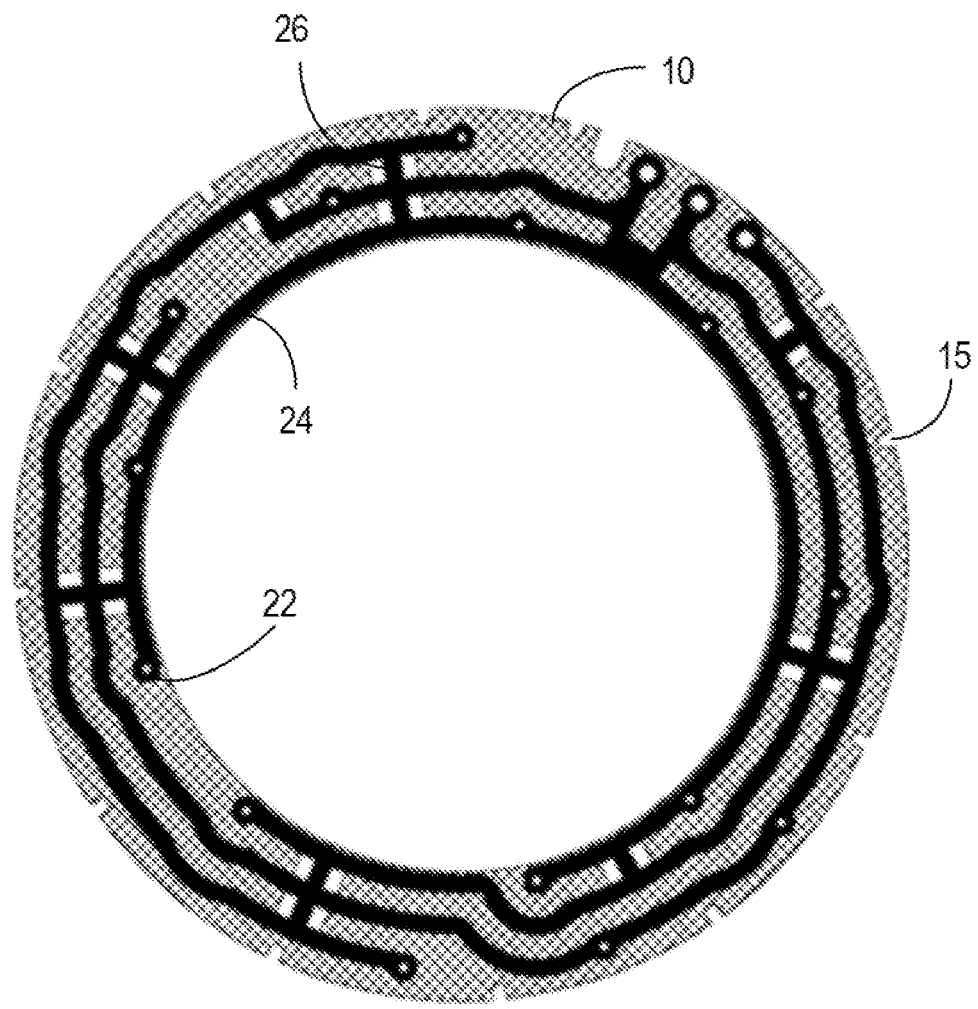
FIG. 5 is a schematic diagram illustrating a conductor provided in a wiring apparatus according to an embodiment of the present disclosure, in which an annular member is hidden to show a configuration of the conductor.

FIG. 5 shows an arrangement of the conductor 20 embedded in the annular member 10. As shown, in some embodiments, the conductive bar 24 may be spirally arranged in the annular member 10 and insulated from the outside by the annular member 10. According to different wiring requirements, the corresponding arrangement of the conductive bar 24 can be designed in advance. Users only need to connect the enameled wire 4 of the motor 20 through the first set of holes 16 or the second set of holes 18 of the annular member 10 to couple with the joints 22 to complete the wiring without crimping or welding. This greatly improves the efficiency of automatic wiring. In addition, since the enameled wire 4 does not need an insulation protection such as insulation sleeves, crimp terminals, insulation tapes, etc., the cost of wiring can be reduced.

The spiral arrangement can make use of the space of the annular member 10 to the maximal content without increasing the size of the wiring apparatus 1.

In some embodiments, the thickness and the width of the conductive bar 24 can be adjusted according to output current and installation space of the motor 2. In some embodiments, the conductive bars 24 may be arranged along the circumferential direction of the annular member 10 according to the principle of the shortest distance and no crossing. Although the number of the joints 22 on the conductive bar 24 is shown in FIG. 5, it is to be understood that the number shown here is only illustrative, and the specific number is not limited by embodiments of the present disclosure.

In other embodiments, as shown in FIG. 5, several supporting bars 26 may be provided between the conductive bars 24. The supporting bars 26 ensure the integrity of the conductive bars 24 during the injection molding process so that the conductive bars 24 can be set in a predetermined position. In addition, the supporting bars 26 ensure relative electrical insulation distance between the conductive bars 24, thereby improving the electrical performance of the conductive bars 24. In an alternative embodiment, after the injection molding is completed, the supporting bars 26 may be removed.

Embodiments of the present disclosure relates to the motor 2. The motor 2 comprises the wiring apparatus 1 discussed above. The motor 2 may be a servo motor used on an industrial robot. In an alternative embodiment, the motor 2 may be a small and medium-sized AC servo motor having concentrated windings.

According to the wiring apparatus 1 of the present disclosure, due to its compact structure, the thickness of a leading-out terminal of the winding terminal of the motor 2 can be reduced, thereby making the design of the motor 2 more compact and reliable. In addition, the present disclosure can make the wiring of the enameled wire 4 and the lead wire 3 of the motor 2 simpler, which can realize automatic wiring to match the process flow of the production line. This is beneficial to mass production.

In spite of claims in this application drafted for specific combinations of features, it should be understood that the scope of the present disclosure also comprises any novel feature or any novel combination of features disclosed herein, explicitly or implicitly, or any generalization thereof, regardless of whether it involves the same solution in any of the claims currently claimed.

We claim:

1. A wiring apparatus for a motor, comprising:
   an annular member having a first side adjacent to a motor and a second side opposite to the first side; and
   a conductor embedded in the annular member and comprising a plurality of joints coupled to each other via a conductive bar;
   wherein the annular member comprises a first group of holes and a second group of holes, the first group of holes each extending from the first side to the plurality of joints to insert a plurality of enameled wires from the first side of the annular member, the second group of holes arranged opposite to the first set of holes and each extending from the second side to the plurality of joints to insert a plurality of enameled wires from the second side of the annular member.

2. The wiring apparatus of claim 1, wherein the annular member further comprises:
   a groove arranged at a periphery of the annular member and extending from the first side to the second side, the groove being adapted for an enameled wire of the motor to pass through from the first side to enter the second set of holes on the second side, so as to be connected to the joint.

3. The wiring apparatus of claim 1, wherein the annular member further comprises:
   a welding hole provided at a periphery of the annular member and extending from the first side to the second side, the welding hole being adapted for a lead wire of the motor to pass through to be welded to the lead wire.

4. The wiring apparatus of claim 3, wherein the welding hole comprises a plurality of welding holes arranged adjacent to each other at the periphery of the annular member.

5. The wiring apparatus of claim 1, further comprising:
a protrusion adjacent to a periphery of the annular member and extending from the first side toward the motor so as to be inserted into a recess of the periphery of a stator of the motor.

6. The wiring apparatus of claim 1, wherein the conductor is made of a metal comprising copper.

7. The wiring apparatus of claim 1, wherein the annular member is made of an insulating material.

8. The wiring apparatus of claim 1, wherein the conductive bar is helically arranged in the annular member and is insulated from outside by the annular member.

9. An apparatus, comprising:
a motor; and
a wiring apparatus, comprising:
an annular member including a first side adjacent to the motor and a second side opposite to the first side; and
a conductor embedded in the annular member and comprising a plurality of joints coupled to each other via a conductive bar;
wherein the annular member comprises a first group of holes and a second group of holes, the first group of holes each extending from the first side to the plurality of joints to insert a plurality of enameled wires from the first side of the annular member, the second group of holes arranged opposite to the first set of holes and each extending from the second side to the plurality of joints to insert a plurality of enameled wires from the second side of the annular member.

10. The apparatus of claim 9, wherein the annular member further comprises a groove arranged at a periphery of the annular member and extending from the first side to the second side, the groove being adapted for an enameled wire of the motor to pass through from the first side to enter the second set of holes on the second side, so as to be connected to the joint.

11. The apparatus of claim 10, wherein the annular member further comprises a welding hole provided at a periphery of the annular member and extending from the first side to the second side, the welding hole being adapted for a lead wire of the motor to pass through to be welded to the lead wire.

12. The apparatus of claim 11, wherein the welding hole comprises a plurality of welding holes arranged adjacent to each other at the periphery of the annular member.

13. The apparatus of claim 9, further comprising a protrusion adjacent to a periphery of the annular member and extending from the first side toward the motor so as to be inserted into a recess of the periphery of a stator of the motor.

14. The apparatus of claim 9, wherein the conductor is made of a metal comprising copper.

15. The apparatus of claim 9, wherein the annular member is made of an insulating material.

16. The apparatus of claim 9, wherein the conductive bar is helically arranged in the annular member and is insulated from outside by the annular member.

* * * * *